United States Patent [19]

Yamaguchi et al.

[11] Patent Number: 5,177,652
[45] Date of Patent: Jan. 5, 1993

[54] DUAL-ACTUATOR TRANSDUCER POSITION CONTROL APPARATUS FOR SEEKING AND FOLLOWING TRACK ON ROTARY DISK

[75] Inventors: Yuzo Yamaguchi, Tsuchiura; Takayuki Munemoto, Ibaraki, both of Japan

[73] Assignee: Hitachi, Ltd., Tokyo, Japan

[21] Appl. No.: 503,909

[22] Filed: Apr. 4, 1990

[30] Foreign Application Priority Data

Apr. 7, 1989 [JP] Japan .................. 1-88905

[51] Int. Cl.⁵ .................................... G11B 5/596
[52] U.S. Cl. ..................... 360/78.05; 360/77.02; 318/593
[58] Field of Search ............. 360/77.02, 78.05; 318/593

[56] References Cited

U.S. PATENT DOCUMENTS

| | | | |
|---|---|---|---|
| 3,924,268 | 12/1975 | McIntosh et al. | 360/78.05 |
| 4,630,145 | 12/1986 | Thompson et al. | 360/78.05 X |
| 4,682,253 | 7/1987 | Leslie | 360/77.02 |
| 4,858,040 | 8/1989 | Hazebrouck | 360/78.05 |
| 4,875,120 | 10/1989 | Takahashi et al. | 360/78.05 X |
| 4,969,058 | 11/1990 | Williams et al. | 360/78.05 X |

FOREIGN PATENT DOCUMENTS

| | | | |
|---|---|---|---|
| 59-96571 | 6/1984 | Japan | 360/77.02 |
| 59-203272 | 11/1984 | Japan | 360/77.02 |
| 60-131674 | 7/1985 | Japan | 360/77.02 |
| 62-75984 | 4/1987 | Japan | 360/78.05 |
| 62-26109 | 6/1987 | Japan | 360/77.02 |

OTHER PUBLICATIONS

Lissner, et al., "Disk File Actuator", IBM Technical Disclosure Bulletin, vol. 17, No. 10, Mar. 1975, pp. 3016-3018.

*Magnetic Recording* vol. II (Computer Data Storage): Mee & Daniel; pp. 61-67; 1988.

Primary Examiner—Joseph L. Dixon
Assistant Examiner—David L. Robertson
Attorney, Agent, or Firm—Antonelli, Terry, Stout & Kraus

[57] ABSTRACT

In a rotary-disk transducer position control apparatus and method in which positional information concerning a transducer relative to a rotary disk based on a signal is obtained from the transducer which is disposed in opposition to the rotary disk, a seek instruction is inputted through an input device so that a first transducer access mechanism is caused to make the transducer perform a seeking operation at a low speed with a large stroke in accordance with both the positional information and the seek instruction, and in order to make the transducer perform both a seeking operation and a following operation, a second transducer access mechanism is caused to drive the transducer at a high speed with a small stroke in accordance with the positional information and the seek instruction.

8 Claims, 5 Drawing Sheets

DUAL-ACTUATOR TRANSDUCER POSITION CONTROL APPARATUS FOR SEEKING AND FOLLOWING TRACK ON ROTARY DISK

BACKGROUND OF THE INVENTION

The present invention relates to an apparatus and a method for controlling the position of a transducer for a rotary disk, and, particularly, relates to a magnetic disk unit in which high-speed access is required and a method for controlling such a magnetic disk unit.

A servo system in which positioning of a transducer is carried out by a single access mechanism has been used in a conventional apparatus for performing position control on a transducer for a magnetic disk. In general, access mechanisms are classified into two groups, one being a group of access mechanisms of the servo-surface servo system as disclosed, for example, in U.S. Pat. No. 4,682,253, the other being a group of access mechanisms of the data-surface servo system as disclosed, for example, in Japanese Patent Examined Publication No. 62-26109.

In both the systems, two operations are performed by a single access mechanism, one being a seeking operation for moving a transducer from a current track position to a target track position based on track positional information recorded on a rotary disk in advance, the other being a following operation for detecting the deviation of the transducer position from the target track position in the form of a servo signal after the transducer has been moved to the vicinity of the target track position and for performing tracking control of the transducer position to make the deviation zero.

To improve the accuracy in transducer positioning with the advance of high density in the magnetic disk unit, for example as disclosed in Japanese Patent Unexamined Publication No. 59-96571, there has been proposed a system in which a second access mechanism using a piezo element or the like is mounted on a first access mechanism, which is the aforementioned conventional access mechanism, so that the following operation is carried out by the second access mechanism after the seeking operation has been carried out by the first access mechanism. On the other hand, with respect to the servo-surface servo system, for example as disclosed in Japanese Patent Unexamined Publication Nos. 59-203272 and 60-131674, there has been proposed a system in which the relative positions of a servo transducer and a data transducer are corrected by a second access mechanism for the purpose of heat-off-track correction.

In the aforementioned conventional techniques, the seeking operation for moving a transducer from the current track position to the desired or target track position is carried out only by the low-speed large-stroke first access mechanism. There arises a problem, therefore, in that a relatively long seek time is required even in the case where the transducer is moved by a short distance, for example, in the case where the transducer is moved to an adjacent track.

This type magnetic disk unit is often used in such a manner that adjacent tracks are traced sequentially one by one. In this case, it is required to perform data access in a minimum time.

SUMMARY OF THE INVENTION

An object of the present invention is to provide a rotary-disk transducer position control apparatus and a method therefore, in which a short-distance seeking operation can be made at a high speed.

In order to attain the above object, according to an aspect of the present invention, there are provided a first low-speed large-stroke transducer access mechanism, a second high-speed small-stroke transducer access mechanism, and means for positioning a transducer opposite to a recording track on a rotary disk and for performing writing information onto the track and/or reading information from the track, the second transducer access mechanism being configured to have a seeking function as well as a following function.

In order to attain the above object, according to another aspect of the present invention, there are provided a first transducer access mechanism, a second transducer access mechanism mounted on a member driven by the first transducer access mechanism and for driving a transducer in the same direction as that of the first transducer access mechanism, and means for positioning the transducer opposite to a recording track on a rotary disk and for performing writing information onto the track and/or reading information from the track, the second transducer access mechanism having both a seeking function and a following function to perform a seeking operation at a high speed. Accordingly, the seeking operation is made rapidly compared with the case where the residual seek distance is sought only by first the low-speed transducer access mechanism.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 1:
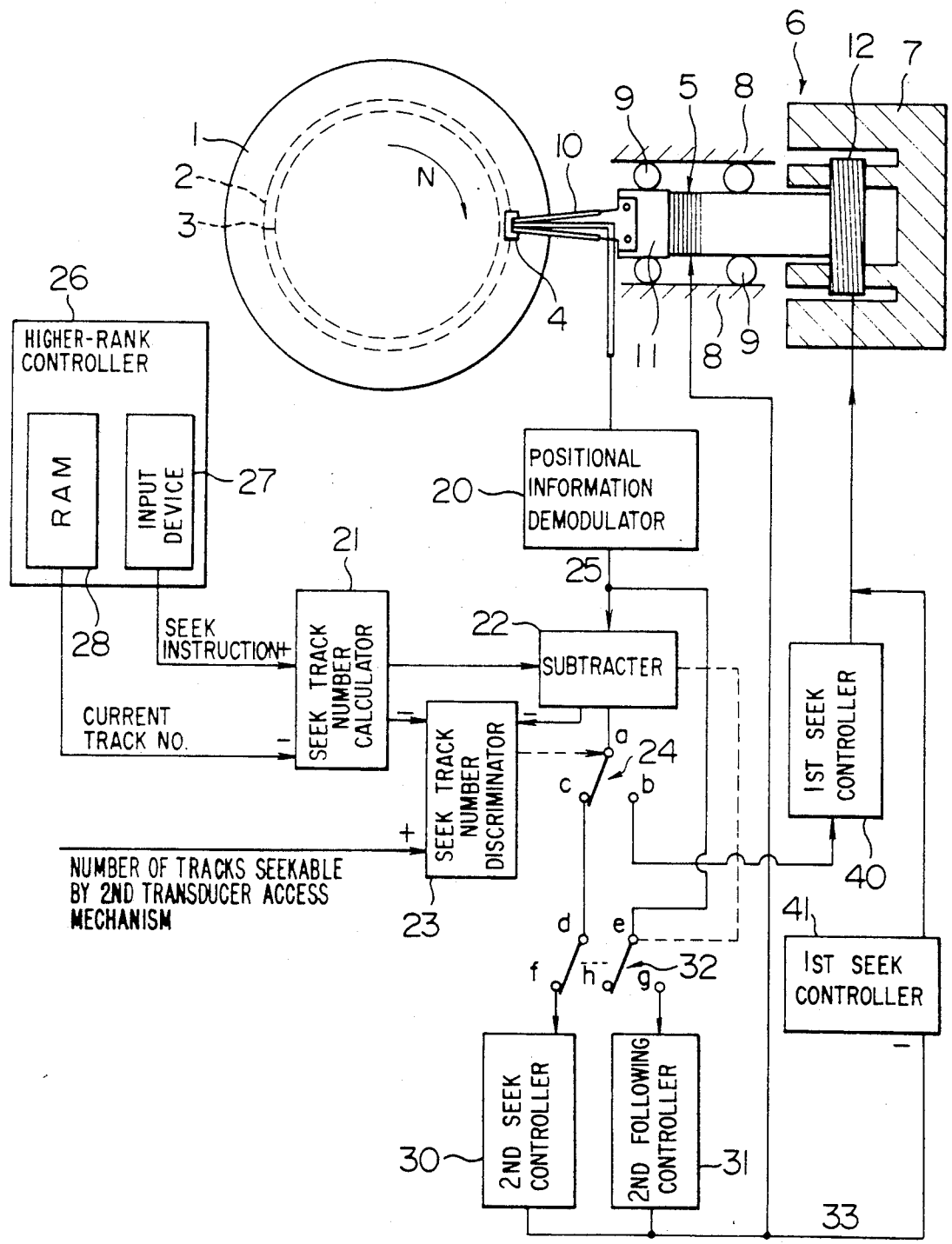
FIG. 1 is a block diagram showing an embodiment of the present invention.

An embodiment of the present invention will be described hereunder with reference to FIG. 1. In FIG. 1, a transducer 4 is attached to a carriage 11 through a supporting spring 10. The carriage 11 is provided with a second actuator 5 constituting a second high-speed small-stroke transducer access mechanism. The carriage 11 is guided by rollers 9 and guides 8 so that the carriage 11 is held movable in the direction of a radius of a disk 1. A first actuator 6 constituting a first low-speed large-stroke transducer access mechanism for driving the carriage 11 in the same direction as the direction of access of the second actuator is provided at an end portion of the carriage 11. For example, the first actuator 6 of the first transducer access mechanism is of a voice-coil motor type and is composed of a magnetic circuit 7 and a coil 12, and the second actuator 5 of the second transducer access mechanism is constituted by a piezo actuator using a piezo element. The maximum stroke of the second actuator is set to a value of 12 μm which is larger than one track pitch of 10 μm.

The transducer 4 is connected to a positional information demodulating circuit 20 which generates a pulse whenever the transducer crosses a track in the seeking operation thereof and, at the same time, generates a distance signal representing the distance from the center of the track. The positional information demodulating circuit 20 is connected to a subtracter 22. The output side of the subtracter 22 is connected to both a seek track number discriminating circuit 23 acting as a comparison operation means and an access mechanism switching circuit 24 acting as a first switching means. The switching circuit 24 has a movable terminal a and a pair of first and second fixed terminals b and c, and arranged so that the movable terminal a is changed over between the first and second fixed terminals b and c. The movable terminal a is connected to the output side of the subtracter 22 and the first fixed terminal b is connected to a first seek control circuit 40 for controlling the first transducer access mechanism. The first seek control circuit 40 is connected to the coil 12 of the first actuator 6. A seek/following switching circuit 32 has two movable terminals d and e and three fixed terminals f, g and h. One movable terminal d of the seek/following switching circuit 32 is connected to the second fixed terminal c of the access mechanism switching circuit 24. The other movable terminal e of the switching circuit 32 is connected to the output terminal of the positional information demodulating circuit 20. The movable terminals d and e of the switching circuit 32 are interlockingly changed over between the fixed terminals f and h and between the fixed terminals h and g respectively. The fixed terminal f is connected to a second seek control circuit 30 for controlling the seeking operation of the second transducer access mechanism, and the fixed terminal g is connected to a second following control circuit 31 for controlling the following operation of the second transducer access mechanism, while the fixed terminal h is not connected to any portion.

The second seek control circuit 30, which is disclosed, for example, in *Magnetic Recording, Volume II: Computer Data Storage*, McGraw-Hill, 1988, pp. 61-67, serves to calculate a speed signal based on the number of residual seek tracks in the subtracter 22 to generate a target transducer speed signal. The second following control circuit 31 is a circuit for performing tracking control. Both the output side of the second seek control circuit 30 and the output side of the second following control circuit 31 are connected commonly to the second actuator 5 and a first seek control circuit 41. The output side of the first seek control circuit 41 is connected to a line connecting the first seek control circuit 40 and the coil 12 of the first actuator 6 to each other. The output side of a seek track number calculating circuit 21 acting as a seek starting distance calculating means is connected to the input side of the subtracter 22. The output side of the seek track number calculating circuit 21 is connected to a seek track number discriminating circuit 23. The seek track number calculating circuit 21 is supplied with both a seek instruction from an input device 27 of a higher-rank controller 26 and a current track number (which is updated whenever a seeking operation is perfected) stored in a RAM 28 in the higher-rank controller 26, so that the circuit 21 calculates a seek track number representing the number of tracks from the current track to the seek instruction track. The subtracter 22 sets the seek track number obtained from the seek track number calculating circuit 21 before the seeking operation and subtracts the number of pulses given by the positional information demodulating circuit 20 therefrom to generate the number of residual seek tracks. On the other hand, the output side of the subtracter 22 is connected to the switching drive side of the seek/following switching circuit 32. The output side of the seek track number discriminating circuit 23 acting as a comparison operation means is connected to the switching drive side of the access mechanism switching circuit 24. The input side of the discriminating circuit 23 is arranged to receive the number of tracks seekable by the second transducer access mechanism.

The aforementioned configuration will be described more in detail in the case where the transducer 4 is moved (or makes a seeking operation) from the current track 2 on the disk 1 to a target track 3 while the disk 1 is rotated in the direction of the arrow N. This is the case of the data-surface servo system in which the positional information is obtained from the same track as the data track.

At the time of the starting of a seeking operation, the seek track number discriminating circuit 23 compares the required number of seek tracks received from the seek track number calculating circuit 21 with the number of tracks seekable by the second transducer access mechanism. After the starting of the seeking operation, the seek track number discriminating circuit 23 compares the current number of residual seek tracks received from the subtracter 22 with the number of tracks seekable by the second transducer access mechanism. As a result, the circuit 23 operates as follows. When the required number of seek tracks or the number of residual seek tracks is larger than the number of tracks seekable by the second transducer access mechanism, a negative signal is generated to perform the switching operation of the access mechanism switching circuit 24. When, on the contrary, the number of required seek tracks or the number of residual seek tracks is smaller than the number of tracks seekable by the second transducer access mechanism, a positive signal is generated to perform the switching operation of the access mechanism switching circuit 24. When the positive signal is supplied to the switching drive side, the movable terminal a of the access mechanism switching circuit 24 is changed over to the second fixed terminal c. When the negative signal is supplied to the switching drive side, on the contrary, the movable terminal a of the access mechanism switching circuit 24 is changed over to the first fixed terminal b.

When the output signal of the seek distance discriminating circuit 23 is negative, or in other words, when the required seek distance or the required number of residual seek tracks is larger than the number of tracks seekable by the second transducer access mechanism, the subtracter 22 is connected to the first seek control circuit 40 through the first fixed terminal b of the access mechanism switching circuit 24 through the aforementioned switching operation, so that the control circuit 40 controls the first actuator 6 to perform the seek operation. When the output signal of the seek distance discriminating circuit 23 is positive, or in other words, when the required seek distance or the required number of residual seek tracks is smaller than the number of tracks seekable by the second transducer access mechanism, the subtracter 22 is connected to the seek/following switching circuit 32 through the second fixed terminal c of the access mechanism switching circuit 24 through the aforementioned switching operation. The switching circuit 32 is changed over by the subtracter 22. When the current number of residual seek tracks is represented by a signal corresponding to a larger distance than a one-track distance of the disk 1, or in other words, when the number is larger than 1, the movable terminals d and e of the switching circuit 32 are connected to the fixed terminals f and h respectively. When the current number of residual seek tracks represents a signal corresponding to a smaller distance than the one-track distance of the disk 1, or in other words, when the number is smaller than 1, the movable terminals d and e are connected to the fixed terminals h and g, respectively. When the movable terminal d of the seek/following switching circuit 32 is connected to the fixed terminal f of the same, the transducer positional information is transmitted from the subtracter 22 to the second seek control circuit 30 so that the second seek control circuit 30 controls the high-speed small-stroke second actuator 5 based on the transmitted positional information to thereby perform high-speed seeking and following operations. When the residual, seek distance is reduced to a value smaller than the one-track distance, the switching operation of the seek/following switching circuit 32 is carried out as described above. As a result, the position signal from the positional information demodulating circuit 20 is supplied to the second following control circuit 31 so that the seeking operation based on the operation control of the actuator 5 is ended and the following operation of the second following control circuit 31 is started. In this stage, the data reading/writing operation is started.

The control signal supplied from the second seek control circuit 30 or the second following control circuit 31 to the second actuator 5 also serves as a deviation signal 33 supplied to the first seek control circuit 41 to control the first actuator 6. That is, the first seek control circuit 41 controls the first actuator 6 based on the supplied deviation signal 33 to make the deviation signal 33 zero. As a result, the position of the actuator 6 relative to the second actuator 2 is set to be a reference position. Because the second actuator 5 is constituted by a piezo element, the second actuator 5 is biased by a value proportional to the size of the deviation signal 33. Further, the first actuator 6 is subjected to a servo operation till the deviation signal 33 reaches zero. Accordingly, the servo operation is finished when the deviation signal 33 reaches zero at which the motion of the first actuator 6 stops and the displacement of the second actuator becomes zero.

Figure 2:
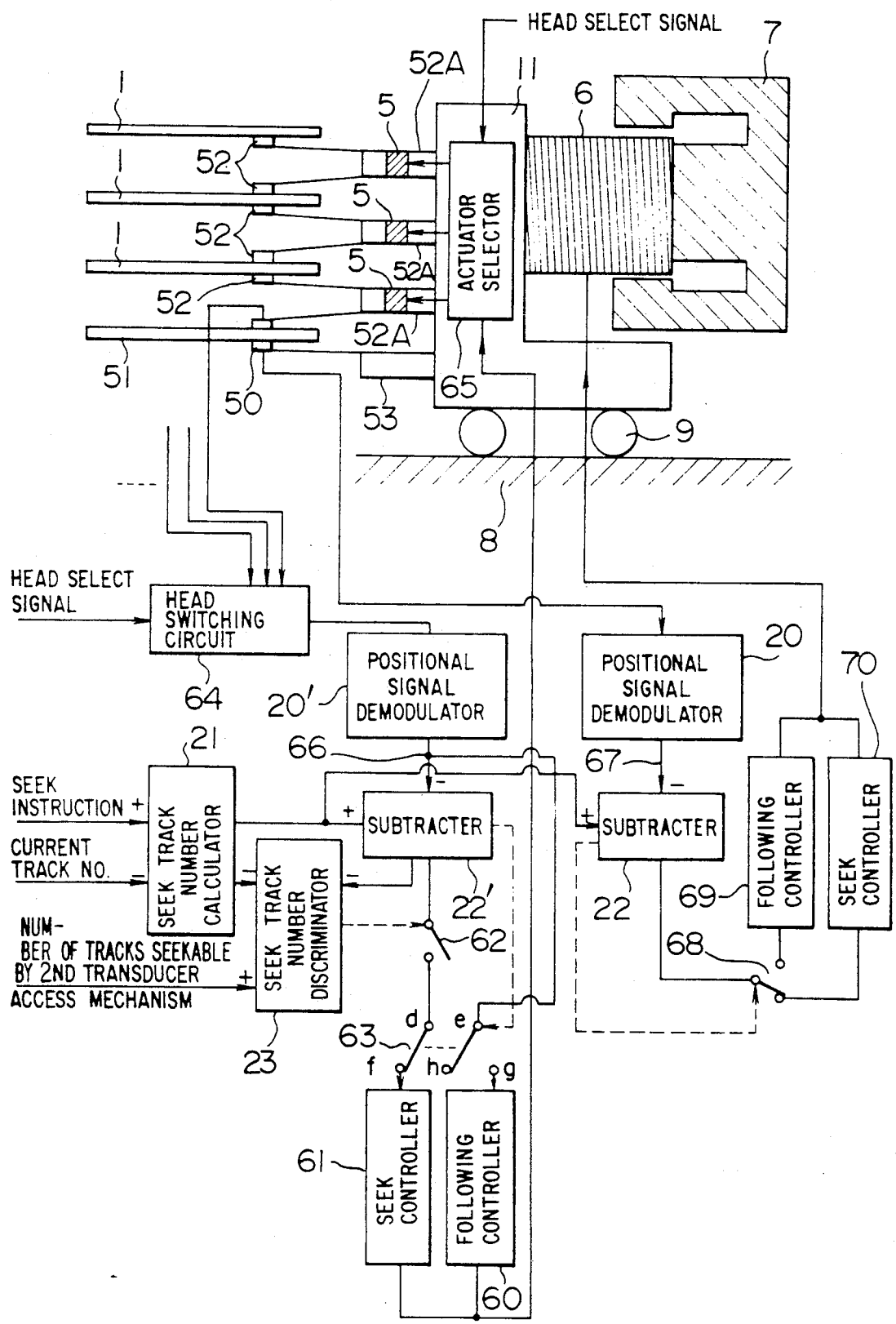
FIG. 2 is a block diagram showing a second embodiment of the invention.

FIG. 2 shows a second embodiment of the magnetic disk unit of the servo system in which both the servo-surface servo system and the data-surface servo system are employed in combination. The first actuator 6 constituting a first transducer access mechanism is attached to the carriage 11 guided by the guides 8 and rollers 9. Data head arms 52A are attached to the carriage 11. Data heads 52 are attached to the forward ends of the data head arms 52A so as to be in opposition to data recording surfaces (including servo information) of disks 1, respectively. Second actuators 5 are provided in the data head arms 52A, respectively. Servo surfaces 51 coaxially rotating with the disks 1 are provided in parallel to the disks 1, respectively. Servo heads 50 arranged in opposition to the servo surfaces to detect servo-surface positional information are attached to the respective forward ends of the servo arms 53 equipped in the carriage 11.

In the following, the control circuit in the magnetic disk unit in FIG. 2 is described.

Being similar to the control circuit depicted in FIG. 1, the control circuit depicted in FIG. 2 is distinguishably different from the control circuit depicted in FIG. 1 in that the control circuit depicted in FIG. 2 is provided with control circuits for the servo-surface servo and the data-surface servo which are provided independently of each other. The seek track number calculating circuit 21 receives both a seek instruction signal and a current track number signal and supplies a required number of seek tracks calculated based on the two input signals to subtracters 22 and 22' and the seek track number discriminating circuit 23. The subtracter 22' receives both the required number of seek tracks and the signal on a signal line 66, calculates a residual number of seek tracks and supplies the result of the calculation to the seek track number discriminating circuit 23 and a switching circuit 63. The seek track number discriminating circuit 23 receives the above-mentioned signals supplied thereto and supplies a switching signal to a switching circuit 62 to perform the change-over operation of the switching circuit 62. Further, the switching circuit 63 is arranged so that a pair of movable terminals d and e are changed over between fixed terminals f and h and between fixed terminals h and g, respectively. The movable terminals d and e are connected to the output of the subtracter 22' through the switching circuit 62 and the output of the position signal demodulating circuit 20' directly. The fixed terminals g and f are connected to the following control circuit 60 and the seek control circuit 61 respectively. The fixed terminal h is not connected to any portion. The respective outputs of the two control circuits 60 and 61 are commonly connected to the actuator selecting circuit 65. The selecting circuit 65 performs its circuit switching operation based on an externally applied head selection signal so that the output of a selected one of the two control circuits 60 and 61 can be supplied to the second actuator. The head selection signal is supplied to a head switching circuit 64 to select a desired one of the heads 52. The output of the selected head 52 is supplied to the position signal demodulating circuit 20'. The demodulating circuit 20' supplies the quantity of position difference of the head 52 from the center of the track to a signal line and, at the same time, generates a pulse whenever the head crosses one track.

On the other hand, the output of the servo head 50 is supplied to the position signal demodulating circuit 20. The output of the demodulating circuit 20 is supplied to the subtracter 22. The subtracter 22 performs down-counting of the output pulses of the demodulating circuit based on the required number of seek tracks to thereby send out the number of residual seek tracks. The output of the subtracter 22 is supplied to a switching circuit 68, and, at the same time, to either one a following control circuit 69 and a seek control circuit 70 of the first actuator. As a result, either one of the output signals of the two control circuits is supplied to the first actuator.

In the above embodiment, the part from the servo disk 51 and the servo head 50 to the first actuator corresponds to the conventional servo-surface servo system, and the part from the data disk 1 and the data head 52 to the second actuator corresponds to the data-surface servo system in which servo information is included in data disk surfaces.

In the following, the operation of this embodiment is described. At the time of the starting of a seeking operation, the seek track number discriminating circuit 23 compares the required number of seek tracks supplied from the seek track number calculating circuit 21 with the number of tracks seekable by the second transducer access mechanism. After the starting of the seeking operation, the seek track number discriminating circuit 23 compares the number of currently residual seek tracks supplied from the subtracter with the number of tracks seekable by the second transducer access mechanism. Based on this result, the circuit 23 operates as follows. When the required number of seek tracks or the number of residual seek tracks is smaller than the number of tracks seekable by the second transducer access mechanism, a positive signal is generated. When, on the contrary, the required number of seek tracks or the number of residual seek tracks is larger than the number of tracks seekable by the second transducer access mechanism a negative signal is generated. When the positive signal is supplied to the switching circuit 62, the switching circuit 62 is turned on. When the negative signal is supplied to the switching circuit 62, on the contrary, the switching circuit is turned off. In short, when the number of tracks seekable by the second actuator is larger than the number of residual tracks, the second actuator 5 is driven to perform positioning of the data head 52 to a target track at a high speed. Therefore, the switching circuit 63 is provided which changes over between the following control circuit 60 for performing an accurate tracking operation and the seek control circuit 61 for performing a high-speed seeking operation based on the output of the subtracter 22'. In this embodiment, the signal supplied from the position signal demodulating circuit 26 to the signal line 66 is a pulse signal generated at every time of the crossing of one track with the seek operation or a signal representing the quantity of positional difference between the heads 50 and 52. The number of seek tracks, together with the seek instruction, supplied to the subtracters 22 and 22' is the number of tracks to be crossed by the heads 50 and 52 before the heads reach the target track. At this time, the subtracters 22 and 22' subtract one from the number of tracks whenever a pulse is generated in the period of the seeking operation to thereby calculate the number of residual seek tracks.

In this embodiment, when the number of tracks seekable by the second actuator 5 is larger than the number of residual seek tracks, the second actuator performs positioning of the data head 52 at a high speed. Accordingly, a difference arises between the residual distances or positional difference quantities indicated by the servo head 50 and data head 52. Therefore, the servo information detected by the servo head is processed by a control system (20, 22, 68, 69 and 70) different from the data head control system. In short, the first actuator performs positioning of the servo head 50 to a target track based on the servo information detected by the servo head 50 with the time delay from the positioning of the data head. Accordingly, the first actuator is moved to a forward end of the movable range thereof to perform positioning at a high speed, whereas the second actuator is lately moved to the vicinity of the center of the movable range thereof to make a preparation for a next seeking operation because of the delayed seeking operation of the first actuator.

Figure 3:
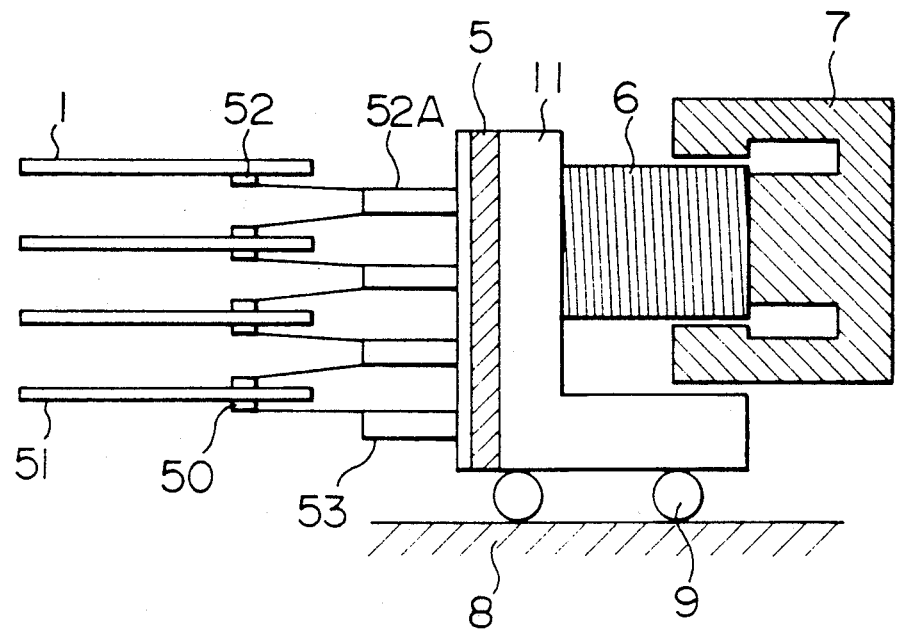
FIGS. 3 and 4 are sectional views of mechanism portions showing further embodiments of the invention.

FIG. 3 is a view showing a third embodiment using the servo-surface servo system. In this embodiment, each servo arm 53 and a corresponding data arm 52A are combined into one body which is attached onto a carriage 11 through a second actuator 5. The arrangement of circuits for performing seeking and following operations in this embodiment is the same as in the data-surface servo method shown in FIG. 1. Comparing this embodiment with the second embodiment in FIG. 2, the relative position of the data head 52 and the servo head 50 in the second embodiment changes at the time of the seeking operation and at the time of the following operation, but the relative position of the two is constant in this embodiment. Accordingly, in this embodiment, the track number in every data head can be represented by the track number in the servo head. As a result, the memory required for storing the track number in every data head is not used in this embodiment.

Figure 4:
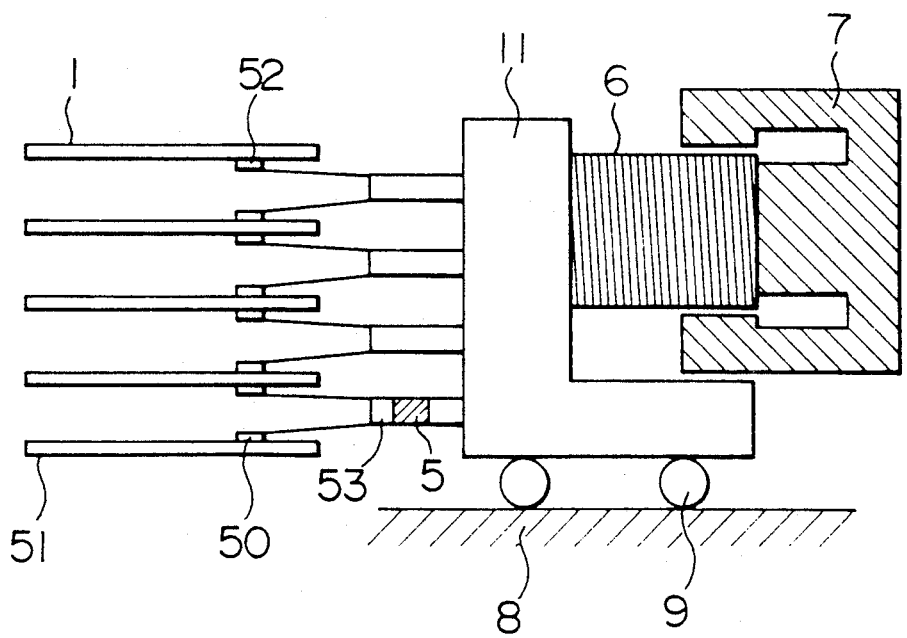

FIG. 4 shows a fourth embodiment of the magnetic disk unit using the servo-surface servo system. In this embodiment, the second actuator 5 is attached to the servo arm 53 supporting the servo head. The control method used in this embodiment is the same as that in the case of the first embodiment in FIG. 1. According to this embodiment, the number of second actuators 5 can be reduced to one.

In the aforementioned embodiment, a piezo element is used as the second actuator. Accordingly, the deviation signal 33 which is a second actuator control signal can be used as the quantity of displacement of the second actuator relative to the first actuator. Of course, a voice-coil motor type actuator may be used as the second actuator. In the case where a voice-coil motor type actuator is used, it is necessary to provide separately means for detecting the quantity of displacement of the second actuator relative to the first actuator to control the actuators to be returned to their reference relative positions constantly. For example, a distance meter based on a laser interference method can be used as this means.

Figure 5:
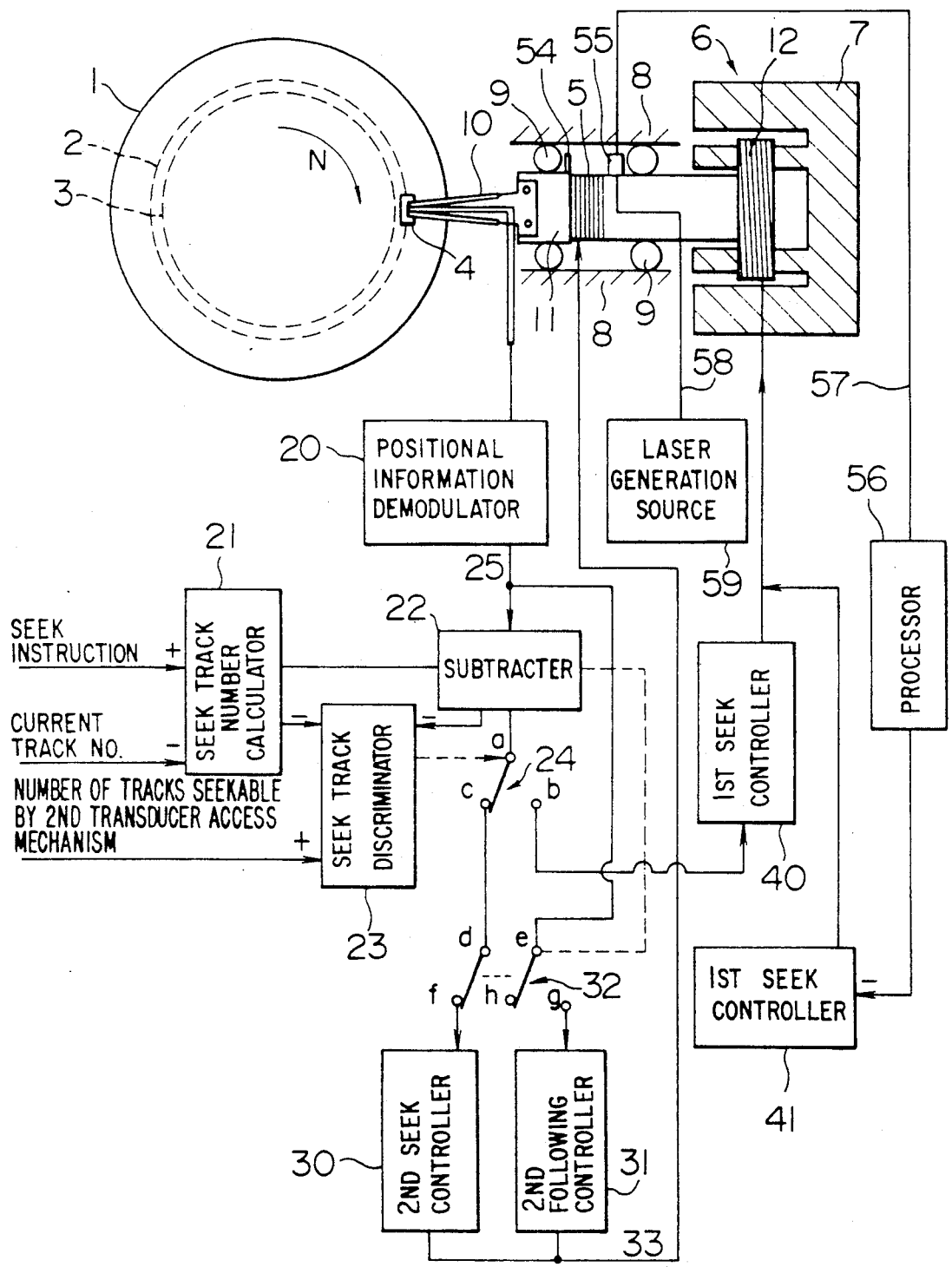
FIG. 5 is a block diagram showing a further embodiment of the invention.

An embodiment is shown in FIG. 5 in the case where such a distance meter based on a laser interference method is used. In this embodiment, a reflection meter 54 is provided on the carriage 11 at a position near to the transducer 4 rather than the second actuator 5 in order to measure the quantity of displacement of the second actuator relative to the first actuator. Further, an interference meter 55 is provided on the carriage 11 and between the second actuator 5 and the first actuator 6. In this embodiment, a laser generation source 59 is arranged at a place far from the interference meter so that laser light is supplied to the interference meter through an optical fiber 58. The quantity of electricity corresponding to the quantity of relative displacement detected by the interference meter 55 is supplied to a processing circuit 56 through a signal line 57. In the processing circuit 56, the quantity of relative displacement is calculated so that a signal representing the quantity of displacement, instead of the deviation signal 33 in the embodiment in FIG. 1, is supplied to the first seek control circuit 41. According to this embodiment, even in the case where any element other than the piezo element may be used as the second actuator, both the seeking operation of the second actuator and the operation of the first actuator for returning the relative positions of the first and second actuators to their reference positions can be made in the same manner as in the first embodiment.

Figure 6:
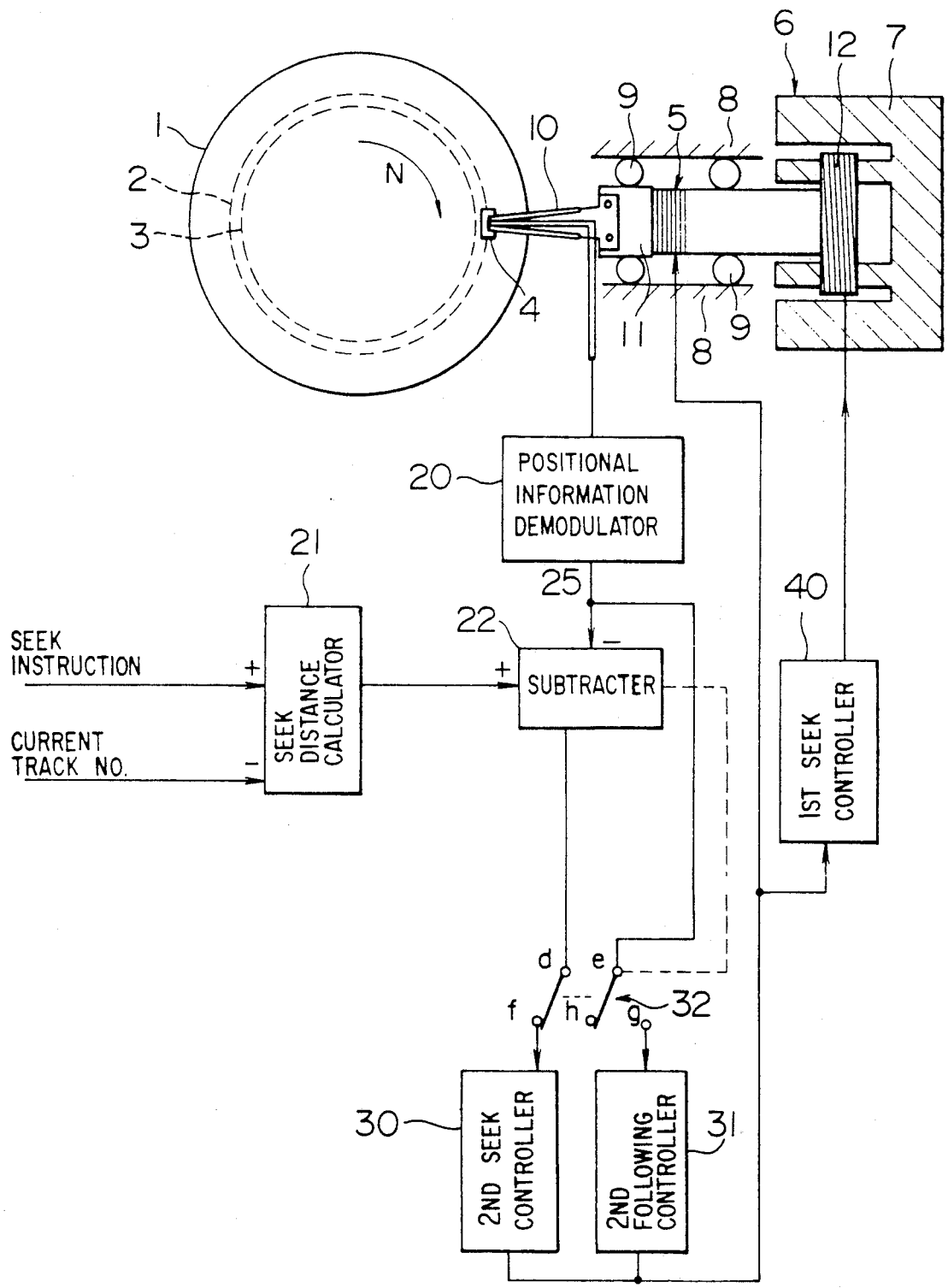
FIG. 6 is a block diagram showing an example of another circuit configuration according to the invention.

In the aforementioned embodiment, the controlling of the second actuator is not started before the number of residual seek tracks reaches the number of tracks seekable by the second actuator. However, the seek time can be shortened by moving the second actuator fully in the seek-enabled distance thereof at the same time of the starting of the driving of the first actuator even in the case where the number of residual seek tracks is larger than the number of tracks seekable by the second actuator. In this case, the seek time can be shortened if the control circuit depicted in FIG. 1 can be partly changed in a manner as shown in FIG. 6.

As described above, in the present invention, when a track number to be sought is designated, both the seeking operations respectively based on the first and second transducer access mechanisms are carried out. The seeking operation based on the low-speed large-stroke first transducer access mechanism is made so that the position of the low-speed large-stroke first transducer access mechanism relative to the second transducer access mechanism can be located in its reference position after the seeking operations. Accordingly, not only the seek time for a near track can be shortened but the relative positional relationship between the two access mechanisms can be always kept in a state which can cope with the next seeking operation. The transducer can be kept on a desired track in the period of the seeking operation of the low-speed large-stroke access mechanism because the following operation of the high-speed small-stroke access mechanism can be made at a high speed.

According to the present invention, the seeking operation to a near track can be made at a high speed, so that there is an effect in improvement in the throughputting of the magnetic disk unit.

What is claimed is:

1. A rotary-disk transducer position control apparatus for positioning a transducer at a position confronting a desired recording track of a plurality of recording tracks on a rotary disk to enable information to be written on or read from the desired recording track, the rotary-disk transducer position control apparatus comprising:
   a first transducer access mechanism;
   a second transducer access mechanism;
   a first control circuit for controlling the first transducer access mechanism; and
   a second control circuit for controlling the second transducer access mechanism;
   wherein the first transducer access mechanism moves the second transducer access mechanism and the transducer relative to the rotary disk, and the second transducer access mechanism moves the transducer relative to the first transducer access mechanism; and
   wherein the first control circuit controls the first transducer access mechanism based on an output of the second control circuit.

2. An apparatus according to claim 1, wherein the first transducer access mechanism is a low-speed large-stroke transducer access mechanism, and the second transducer access mechanism is a high-speed small-stroke transducer access mechanism.

3. An apparatus according to claim 2, further comprising:
   means for deriving a transducer position signal representing a current position of the transducer from an output of the transducer;
   means for calculating a starting number of seek tracks indicative of a difference between an initial position of the transducer when starting a seek operation and the desired track based on the initial position of the transducer and a desired track number indicative of the desired track;
   means for calculating a residual number of seek tracks indicative of a difference between the current position of the transducer and the desired track based on the transducer position signal and the starting number of seek tracks;
   comparing means for comparing the starting number of seek tracks with a number of tracks seekable by the second transducer access mechanism when starting the seek operation, and for comparing the residual number of seek tracks with the number of tracks seekable by the second transducer access mechanism after starting the seek operation; and
   means for actuating the second transducer access mechanism when a result of the comparison performed by the comparing means indicates that at least one of the starting number of seek tracks and the residual number of seek tracks is smaller than the number of tracks seekable by the second transducer access mechanism.

4. An apparatus according to claim 1, further comprising:
   means for producing a seek instruction specifying a desired track number indicative of the desired track; and
   means for deriving a current track number indicative of a current track confronting the transducer based on an output of the transducer;
   wherein the output of the second control circuit is indicative of a difference between the desired track number and the current track number.

5. An apparatus according to claim 4, wherein the first control circuit controls the first transducer access mechanism to reduce the output of the second control circuit substantially to zero.

6. A rotary-disk transducer position control apparatus for positioning a transducer at a position confronting a desired recording track of a plurality of recording tracks on a rotary disk to enable information to be written on or read from the desired recording track, the rotary-disk transducer position control apparatus comprising:
   a first transducer access mechanism;
   a second transducer access mechanism; and
   a control circuit for controlling the first transducer access mechanism based on a displacement of the second transducer access mechanism relative to the first transducer access mechanism;
   wherein the first transducer access mechanism moves the second transducer access mechanism and the transducer relative to the rotary disk, and the second transducer access mechanism moves the transducer relative to the first transducer access mechanism.

7. An apparatus according to claim 6, wherein the first transducer access mechanism is a low-speed large-stroke transducer access mechanism, and the second transducer access mechanism is a high-speed small-stroke transducer access mechanism.

8. An apparatus according to claim 6, wherein the control circuit controls the first transducer access mechanism to set the displacement of the second transducer access mechanism relative to the first transducer access mechanism to a predetermined displacement.

* * * * *